Dec. 31, 1963    G. E. BORGARD    3,115,954
SELF-CENTERING BRAKE DEVICE
Filed Dec. 14, 1960    2 Sheets-Sheet 2

INVENTOR
GLENN E. BORGARD
BY *Gravely, Lieder & Woodruff*
ATTORNEYS

United States Patent Office 3,115,954
Patented Dec. 31, 1963

3,115,954
SELF-CENTERING BRAKE DEVICE
Glenn E. Borgard, Overland, Mo., assignor to Wagner Electric Corporation, St. Louis, Mo., a corporation of Delaware
Filed Dec. 14, 1960, Ser. No. 75,749
6 Claims. (Cl. 188—78)

This invention relates generally to vehicular braking systems and more particularly to improvements in a compound braking mechanism which is self-centering in both the forward and reverse directions of movement.

A self-centering compound brake is disclosed in Schnell Patent No. 2,755,889 dated July 24, 1956 in which an anchor member is provided for returning the brake shoes to a centered position following a braking application in either the forward or reverse direction of movement. However, this earlier construction has not been entirely satisfactory and it has been discovered that one of the brake shoes thereof has a tendency to drag on the drum thereby developing heat and rapid wear of the friction lining as well as causing an undesirable noise condition.

Accordingly, it is an object of the present invention to provide an improved device overcoming the prior art deficiencies and providing for the self-centering of brake shoes after a braking application. Another object is to provide a positive acting device for centering the brake shoes of a compound brake mechanism in both the forward and reverse direction of rotation. Specifically, it is an object to provide a novel anchor block which will co-act with the brake shoes in a positive manner to assure a centered condition of both shoes with respect to the drum, regardless of the direction of rotation. These and still other objects and advantages will become more apparent hereinafter.

Briefly, the invention is embodied in improved braking mechanism including plural friction means for cooperation with a relatively rotatable member, rotatable anchoring means normally seating opposed surfaces of the plural friction means, one of the friction means being movable away from the anchoring means for braking engagement with the rotatable member and being resiliently moved into torque producing contact with the anchoring means after braking engagement.

Figure 1:
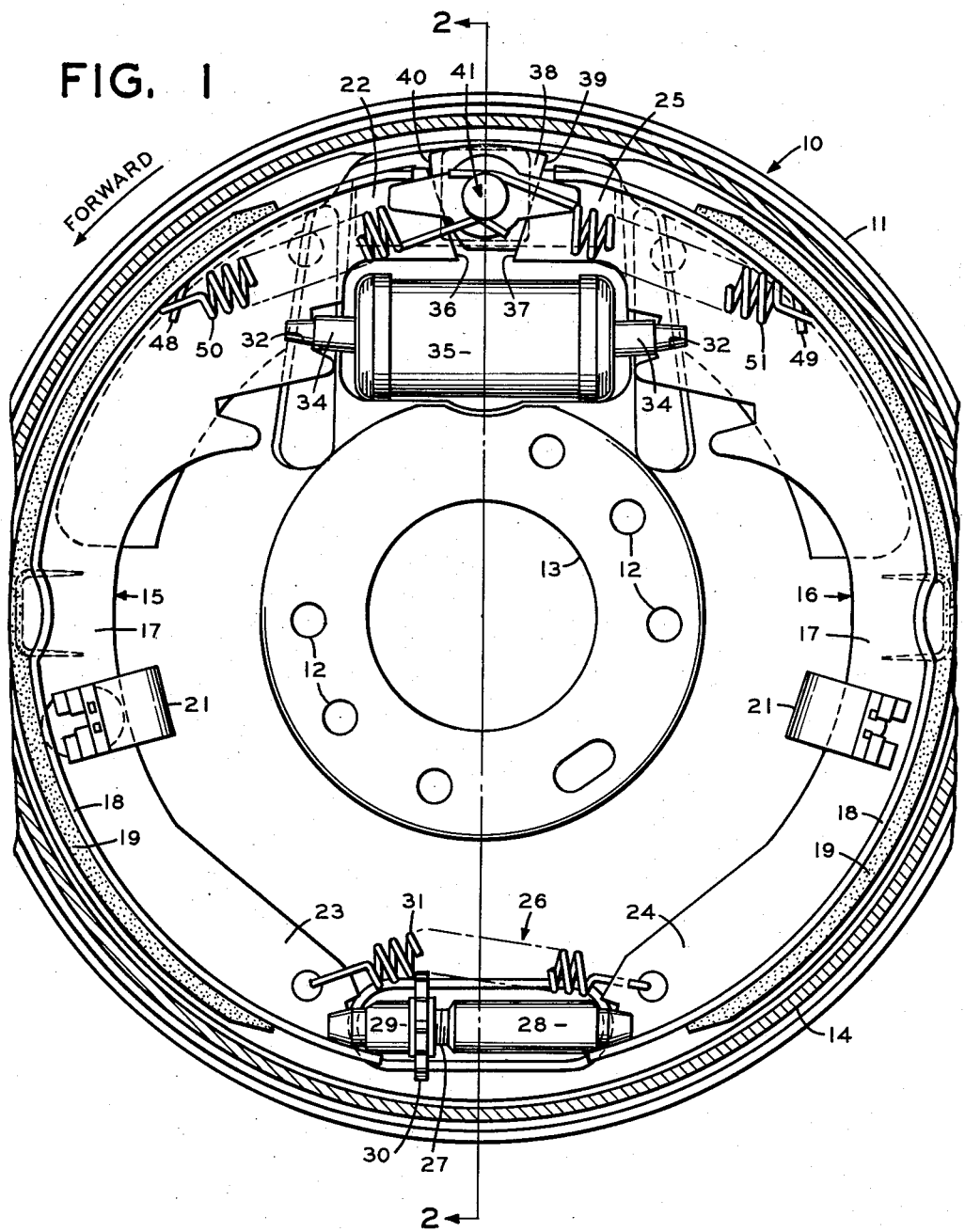
Figure 2:
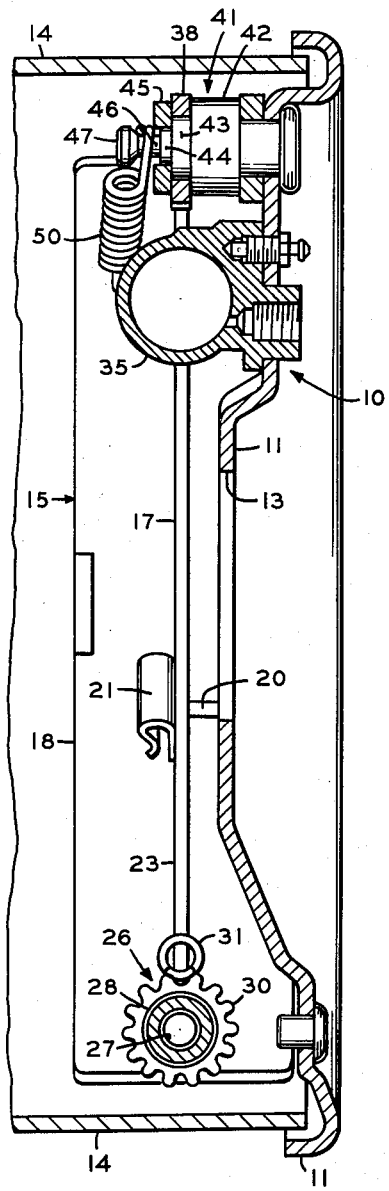
Figure 3:
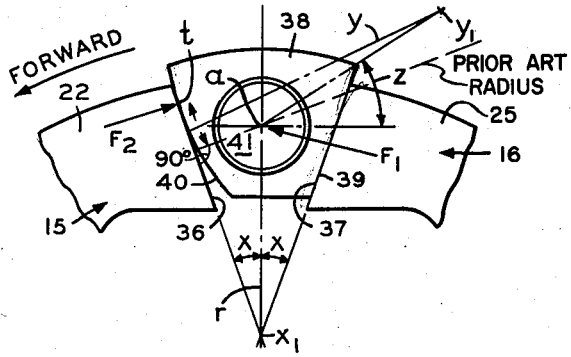
Figure 4:
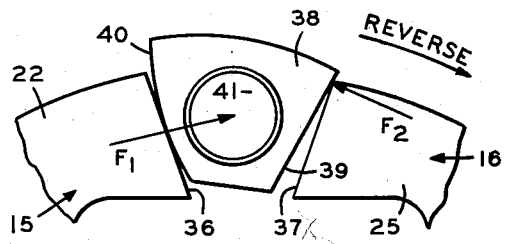

The invention is also embodied in the parts and arrangements and combinations of parts hereinafter described and claimed. In the accompanying drawings which form a part of this specification and wherein like numerals identify like parts wherever they occur:

FIG. 1 is an elevational view, partly in section, of a braking mechanism embodying the invention, FIG. 2 is a vertical cross-sectional view taken along the line 2—2 in FIG. 1, FIG. 3 is an enlarged fragmentary elevational view of self-centering means embodying the invention, and showing the normal position thereof, and FIG. 4 is a view similar to FIG. 3 showing the self-centering action representative of the position of the shoes after a reverse braking engagement.

Referring now to the drawings more particularly by reference numerals, specifically FIGS. 1 and 2, the numeral 10 indicates a wheel brake assembly including a backing plate 11 having a plurality of apertures 12 for securing the backing plate to a rigid supporting structure (not shown) of a vehicle by suitable fastening means. The backing plate 11 also has a central opening 13 through which an axle (not shown) extends, the axle carrying a brake drum 14 and being rotatable therewith relative to the backing plate 11 during operation of the vehicle. The wheel brake assembly 10 also includes primary and secondary brake shoes 15 and 16, each of which contains a web 17 and a table 18 to which a friction lining 19 is secured. The shoes 15 and 16 are supported on the backing plate 11 and are maintained in sliding engagement therewith by guide pins 20 and guide clips 21 so as to maintain the shoes in alignment with the cooperating brake drum 14.

As shown in FIG. 1, the primary shoe 15 includes toe and heel portions, shown generally at 22 and 23, respectively, and the secondary shoe includes toe and heel portions, shown generally at 24 and 25, respectively. The heel portion 23 of the primary shoe 15 is connected with the toe portion 24 of the secondary shoe 16 by a conventional adjustment member 26 disposed therebetween. The adjustment member 26 includes left- and right-hand screws 27 and 28 which are threaded into a sleeve nut 29. A star wheel 30 is provided on the sleeve nut 29 for adjusting the positions of the left- and right-hand screws, and a coiled spring 31 is connected between the heel 23 of the shoe 15 and the toe 24 of the shoe 16 so as to maintain the engagement between said shoes and the adjustment member 26. The spring 31 also engages the star wheel 30 to prevent undesired rotation thereof so that the adjusted positions of the shoes are maintained.

The shoes 15 and 16 also include opposed notches 32, which are formed in the webs 17 adjacent to the toe and heel ends of the shoes 15 and 16 to receive slotted ends of push rods 34. The push rods 34 are adapted to be actuated by pistons (not shown) of a conventional wheel cylinder 35 mounted on the backing plate 11.

The toe 22 of the shoe 15 and the heel 25 of the shoe 16 are provided with flat inclined abutment surfaces 36 and 37, respectively (FIG. 3). When the shoes are in the inoperative position, the surfaces 36 and 37 abut a keystone shaped anchor block 38. As shown in FIG. 3, the right-hand side of the anchor block 38 contains a flat surface 39 formed to complement the flat inclined surface 37 of the heel 25 so as to provide a surface to surface contact therewith. The left-hand side of the block 38 is formed with a convex or arcuate surface 40 which, in the inoperative position, abuts the flat inclined surface 36 of the toe 22 to provide a line contact therewith, as will become more apparent hereinafter.

Referring again to FIG. 2, the anchor block 38 is mounted on an anchor pin 41 which is fastened to the backing plate 11. The pin 41 includes a body portion or spacer 42, a reduced portion 43 on which the anchor block 38 is rotatably mounted, and a further reduced portion 44 on which is mounted a shoe guide 45 having an axial thickness greater than that of the reduced portion 44. Extending outwardly beyond the second reduced portion 44 is a neck 46 and a beveled head 47.

The tables 18 of the shoes 15 and 16 are provided with a pair of hooks 48 and 49 (FIG. 1), and coiled return springs 50 and 51 are connected between the neck 46 and the hooks 48 and 49, respectively, for returning the shoes to the inoperative position after a braking engagement. It will be noted that the beveled head 47 of the anchor pin 41 wedges the ends of the springs 50 and 51 positioned thereon into frictional engagement with the shoe guide 45 which in turn bears against the anchor block 38 to prevent the latter from rotating when the shoes 15 and 16 are disengaged from the anchor block 38 during a braking engagement.

Referring now to FIGS. 3 and 4 wherein the self-centering means including the anchor block 38 and engaging shoe ends 36 and 37 are shown, it will be seen that the axis of rotation or center "$a$" of the anchor block 38 is positioned on a vertical radius "$r$" of the vehicle axle (not shown) or axis of rotation of the drum 14. The inclined or flat abutment surfaces 36 and 37 of the shoes 15 and 16 are formed at similar predetermined angles "$x$" relative to the radius line "$r$" from point "$x_1$," and the surface 39 of the anchor block 38 is complementary to the abutment surface 37 and is normally seated in surface to surface contact therewith. The curved face 40 of the anchor block 38 is scribed by a radius "$y$" from a point "$y_1$," that is offset at an angle "$z$" greater than the angle "$x$" of the flat surfaces 36 and 37 of the shoes 15 and 16. In other words, the curved surface 40 is formed by radius "$y$" from point "$y_1$," which is offset relative to a line perpendicular to the face 36 of the primary shoe 15 to locate the point of tangency or line contact "$t$" between the surfaces 36 and 40 above the center of rotation of the block 38. In practice it has been found that an angle "$z$" offset of $30\frac{1}{2}°$ relative to a surface angle "$x$" of $19°$ locates the point of tangency adjacent to the outer edge of the abutment surface 36 in a radial direction from the axis of drum rotation to provide maximum torque to the anchor block 38, as will appear.

The springs 50 and 51 bias the shoes 15 and 16 toward the anchor block 38 and each develops a return force when its associated shoe is unseated during braking engagement, this return or spring force "$F_1$" having a radial line of action toward the axis "$a$" of the anchor block. However, by reason of the radius offset of the curved surface 40 of the anchor block, a line of force "$F_2$" will act above the center of rotation of the anchor block (or above the normal line of action of the spring force "$F_1$" to the axis "$a$") and thereby create a turning moment or torque on the anchor block. Accordingly, the anchor block 38 is rotated by the positive actuating force "$F_2$" thereon to assure that the shoes 15 and 16 are moved away from the drum 14 in a self-centering action after a braking engagement.

*Operation*

The operation of the device will first be described assuming that the brake drum 14 is rotating in the counter-clockwise or forward direction as indicated by the arrows in FIGS. 1 and 3.

Fluid pressure from a conventional source (not shown) is produced in the wheel cylinder 35 to move the cylinder pistons and push rods 34 outwardly to engage the friction lining 19 of the brake shoes 15 and 16 into frictional braking engagement with the drum 14. Inasmuch as the shoes are pivotally mounted on the adjusting mechanism 26 diametrically opposite to the wheel cylinder 35 and because the engagement is substantially instantaneous, the toe or top portion 22 of the primary shoe 15 is moved into contact with the brake drum 14 and the surface 37 of the secondary shoe heel portion 25 generally moves radially outwardly into drum contact. Furthermore, the drum rotation is in the direction of the movement of the toe 22 and produces a self-energizing effect causing the input force to the shoe 15 to be multiplied and transmitted to the toe 24 of the shoe 16 through the adjusting member 26, the heel 25 of the shoe 16 engaging the anchor block 38 as pointed out. Inasmuch as the additional braking force developed by the shoe 15 augments the braking force developed by the shoe 16, it follows that the sum of the braking forces of both shoes is exerted against the anchor block 38.

When the rotation of the drum is in the forward or counterclockwise direction, the shoe 15 may be defined as the actuating shoe and the shoe 16 is the so-called anchoring shoe. On the other hand, when the rotation of the drum is in the reverse or clockwise direction, the shoe 15 becomes the anchoring shoe and the secondary shoe may be called the actuating shoe. In the reverse direction, the portion 25 of the actuating shoe 16 would then become the toe portion and the portion 24 becomes the heel portion.

In compound brakes which are not self-centering, excessive drum distortion, as results from a severe braking application, causes the brake shoes to wedge or lock with the brake drum. This locking results from unequal forces acting on the anchoring shoe and is generally due to excessive forces between the drum and the toe of the shoe or between drum and the heel of the shoe. The invention disclosed in Schnell Patent No. 2,755,889 approached this problem, but it was found that a drag condition still occurred between the heel portion 25 of the secondary shoe 16 and the drum 14 after a braking engagement. In the present device, the heel 25 of the anchoring shoe 16 slides on the surface 39 of the anchor block 38 so as to move the entire shoe radially outwardly into engagement with the brake drum (and rotate the anchor block when necessary), whereby the braking forces over the entire surface of the friction lining 19 are equalized. Similarly, the forward or actuating shoe 15 has moved away from the anchor block 38 (to permit its rotation by shoe 16 if necessary due to the braking forces exerted thereon), and the shoe 15 is frictionally engaged with the drum 14 and the spring 50 is expanded.

When the brake is released, by releasing pressure in the wheel cylinder 35, the forward shoe return spring 50 moves the shoe 15 back against the curved face 40 of the anchor block 38. The adjusting member 26 between the shoes 15 and 16 causes a general clockwise movement of the reverse or anchor shoe 16, but experience has proven that the heel portion 25 of the shoe 16 still remains in contact with the drum 14 at the top of the brake near the anchor block 38 by the force of the reverse shoe return spring 51. The return impact of the shoe 15 against the curved face 40 of the anchor block 38 is transmitted to the anchor block at the line contact point by the force "$F_2$" acting above the axis of rotation of the block and thereby rotates the anchor block. This rotation of the anchor block pushes the shoe 16 in a general clockwise movement opposed by the spring 51 and producing a resultant vector to slide the shoe 16 inwardly away from the brake drum surface, and thereby eliminating the drag condition. The surface to surface contact is ultimately reestablished between the anchor block 38 and reverse shoe 16, as shown in FIG. 3.

In a reverse braking application as shown by the arrow in FIG. 4, fluid pressure in the wheel cylinder 35 acts on the actuating shoe 16 (relative to the reverse rotation of the drum) to move the toe 25 thereof into contact with the brake drum 14. The self-energizing effect producing braking engagement is similar to that of the braking details defining the forward braking engagement and the sum of the braking torque of both shoes is borne by the anchor block 38 which has a line contact with the anchoring shoe 15. However, because the torque of reverse braking is normally not nearly as great as that of forward braking, a line contact between the shoe 15 and the anchor block 38 will suffice, whereas a surface contact must be maintained between the shoe 16 and the anchor block to support the greater forward braking force. Furthermore, the torque of the brake is transmitted from the reverse or actuating shoe through the forward or anchoring shoe 15 to the curved face 40 of the anchor block 38, and rotates the anchor block so that the point of tangency is on the line of force "$F_1$"

to the center "a" of the anchor pin 41 so that braking torque is transmitted thereto. The actuating shoe 16 has moved away from the anchor block during reverse braking engagement, and permits this anchor block rotation to occur. When the brake is released, the reverse shoe 16 will contact the flat face 39 of the anchor block 38 in a line contact transmitting a turning force "$F_2$" above the center of rotation of the anchor block and causing the block to rotate and translate this torque to return the self-centering means to its inoperaitve position (FIG. 3). This rotation of the anchor black 38 eliminates the drag between the forward shoe 15 and the brake drum 14 in a manner similar to that action eliminating drag conditions between the reverse shoe 16 and the anchor block after a forward braking engagement.

It is to be understood that the foregoing description and the accompanying drawings have been given only by way of illustration and example, and that changes and alterations in the present disclosure, which will be readily apparent to one skilled in the art, are contemplated as within the scope of the present invention which is limited only by the claims which follow.

What I claim is:

1. In a braking mechanism having a pair of brake shoes with adjacent ends, a drum rotatable about a central axis relative to said brake shoes, an anchor block rotatably mounted about an axis on a radius line of said central axis, and resilient means normally maintaining the adjacent ends of said brake shoes seated on opposite sides of said anchor block, the ends of said shoes having flat surfaces formed at predetermined angles relative to the radius line from the central axis, one side of said anchor block having a flat surface substantially complementary to the flat surface of one brake shoe end, and the other side of said anchor block having a curved surface for line contact with the other brake shoe end and formed by a radius line from a center point, which center point and line contact are both offset toward said drum relative to said central axis from an imaginary line extending through the anchor block axis and perpendicular to the flat surface of the other brake shoe.

2. In a braking mechanism having a pair of brake shoes with adjacent ends, a drum rotatable about a central axis relative to said brake shoes, an anchor block rotatably mounted about an axis on a vertical radius line of said central axis, and resilient means normally maintaining the adjacent ends of said brake shoes seated on opposite sides of said anchor block, the end of each of said shoes having a flat surface formed at a predetermined angle from a first point on the radius line from the central axis, one side of said anchor block having a flat surface substantially complementary to the flat surface of one brake shoe end, and the other side of said anchor block having a curved surface in line contact with the flat surface of the other brake shoe end, said curved surface being formed by an arc having a center point displaced above a horizontal radius through the anchor pin axis by an angle greater than the predetermined angle whereby an imaginary line between the center point and the line contact is above the anchor pin axis at the vertical radius line of said central axis.

3. In a braking mechanism including at least two friction members adapted to be energized into braking engagement with a relatively rotatable member, said friction members having adjacent opposed flat end surfaces, rotatable anchoring means having a flat surface and an opposed curved surface normally seating said opposed flat end surfaces of said friction members in surface and line contact, respectively, one of said friction members being unseated from said curved surface of said anchoring means during braking engagement with said rotatable member, and the other friction member being slidable on the flat surface of said anchoring means outwardly into frictional engagement with said rotatable member and being adapted to initiate rotation of the anchoring means in one direction, and resilient means for returning said one friction member into line contact with the curved surface of said anchoring means, which line contact is offset outwardly toward said rotatable member relative to the center of rotation of said anchoring means from an imaginary line extending through the anchor block axis and perpendicular to the flat end surface of said one friction member, and the return of said one friction member into line contact being adapted to initiate rotation of said anchoring means in an opposite direction to positively return the other friction member toward its original seated position on the flat surface of said anchoring means.

4. In a braking mechanism having a pair of brake shoes with adjacent ends, a drum rotatable about a central axis relative to said brake shoes, an anchor block rotatably mounted about an axis on a vertical radius line of said central axis, and spring means normally maintaining the adjacent ends of said brake shoes seated on opposite sides of said anchor block, the ends of said shoes having flat surfaces formed at similar angles diverging upwardly from the vertical radius line below said anchor block, one side of said anchor block having a flat surface substantially complementary to the flat surface of one brake shoe end, and the other side of said anchor block having a curved surface formed by an arc from a center point, which center point is offset toward said drum relative to the central axis from an imaginary line extending through the anchor block axis and perpendicular to the flat surface of the other brake shoe whereby said curved surface has a line of tangency with the flat surface of said other brake shoe that is normally offset toward said drum from the imaginary line, said spring means moving said other brake shoe into line contact with said anchor block at said line of tangency after a braking application and producing a turning force to rotate said anchor block and positively move said one brake shoe away from said drum.

5. In a braking mechanism including a backing plate, a pair of brake shoes carried on said backing plate and having flat end surfaces, a brake drum rotatable relative to said brake shoes about a central axis, anchoring means comprising an anchor pin secured to said backing plate and an anchor block mounted on said anchor pin and rotatable thereon, said anchor block being positioned between said end surfaces of said brake shoes and having one side formed with a flat surface in abutment with the flat end surface of one of said brake shoes and another side formed with a rounded surface in line contact with the flat end surface of the other of said brake shoes, resilient means between the anchor pin and each brake shoe and producing lines of force urging said brake shoes toward the anchor pin for normally maintaining the end surfaces of said brake shoes in abutment with said anchor block, and said line contact between said other brake shoe and the rounded surface of said anchor block being offset outwardly toward said drum relative to the line of force of said resilient means whereby the return of said other brake shoe into line contact with said rounded surface of said anchor block produces a moment arm relative to the axis of said anchor pin to effect positive rotation of said anchor block.

6. A braking mechanism comprising a backing plate; at least two arcuate brake shoes movably mounted on said backing plate in opposed relationship and being movable into braking engagement with a brake drum which is rotatable in both forward and reverse directions; a fluid motor for moving the brake shoes into engagement with the brake drum; said brake shoes having two sets of opposed ends; means connecting together one set of opposed brake shoe ends; and an anchor block having opposed side faces and being pivotally mounted on said backing plate between the other opposed brake shoe ends for engagement therewith, said other brake shoe ends having flat surfaces, the side face of the block adjacent to the one shoe which becomes the anchoring shoe when the brake drum rotates in the reverse direction being curved to provide line contact between the flat end surface of said one shoe and the block, the other opposed side face of the block being flat and normally in surface contact with the flat end surface of said other shoe, the point of line contact on said block normally being outwardly toward said brake drum from an imaginary line extending through the pivot axis of said block and perpendicular to the flat end surface of said one shoe, and said anchor block rotating during reverse braking engagement to move said point of line contact on said block away from said brake drum to a point coinciding with the imaginary line to transfer the torque of said brake shoes directly to the pivot axis of said anchor block and said backing plate.

References Cited in the file of this patent
UNITED STATES PATENTS

| | | |
|---|---|---|
| 2,755,889 | Schnell | July 24, 1956 |
| 2,902,118 | Parker | Sept. 1, 1959 |